US006960849B1

(12) United States Patent
Klody et al.

(10) Patent No.: US 6,960,849 B1
(45) Date of Patent: Nov. 1, 2005

(54) THREE-DIMENSIONAL MICROELECTROMECHANICAL TILTING PLATFORM OPERATED BY GEAR-DRIVEN RACKS

(75) Inventors: Kelly A. Klody, Albuquerque, NM (US); Robert D. Habbit, Jr., Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 183 days.

(21) Appl. No.: 10/404,780

(22) Filed: Mar. 31, 2003

(51) Int. Cl.[7] .................................. H02N 1/00
(52) U.S. Cl. ........................ 310/40 MM; 310/309; 359/291; 60/527
(58) Field of Search ................ 310/309, 40 MM; 385/18; 359/290, 291, 223, 226; 74/29, 76; 257/425, 420; 60/527

(56) References Cited

U.S. PATENT DOCUMENTS

| 5,631,514 | A | | 5/1997 | Garcia | 310/309 |
|---|---|---|---|---|---|
| 5,641,957 | A | * | 6/1997 | Chae | 250/231.14 |
| 5,804,084 | A | | 9/1998 | Nasby | 216/2 |
| 5,862,003 | A | | 1/1999 | Saif | 359/871 |
| 5,955,801 | A | | 9/1999 | Romero | 310/40 MM |
| 5,959,375 | A | | 9/1999 | Garcia | 310/40 MM |
| 5,990,473 | A | * | 11/1999 | Dickey et al. | 250/231.13 |
| 6,082,208 | A | | 7/2000 | Rodgers | 74/406 |
| 6,133,670 | A | | 10/2000 | Rodgers | 310/309 |
| 6,175,170 | B1 | | 1/2001 | Kota | 310/40 MM |
| 6,211,599 | B1 | | 4/2001 | Barnes | 310/309 |
| 6,220,561 | B1 | | 4/2001 | Garcia | 248/487 |
| 6,283,601 | B1 | | 9/2001 | Hagelin | 359/871 |
| 6,300,665 | B1 | | 10/2001 | Peeters | 257/415 |
| 6,313,562 | B1 | | 11/2001 | Barnes | 310/306 |
| 6,366,414 | B1 | | 4/2002 | Aksyuk | 359/822 |
| 6,507,138 | B1 | | 1/2003 | Rodgers | 310/309 |
| 6,545,385 | B2 | * | 4/2003 | Miller et al. | 310/309 |
| 6,704,132 | B2 | * | 3/2004 | Dewa | 359/290 |
| 2001/0048265 | A1 | * | 12/2001 | Miller et al. | 310/309 |
| 2002/0158548 | A1 | | 10/2002 | Min et al. | |

FOREIGN PATENT DOCUMENTS

WO        2004081991    *   9/2004

OTHER PUBLICATIONS

Frank T. Hartley, "Mesoscopic Steerable Mirror," *NASA Tech Brief*, vol. 26, pp. 1-2, Apr. 1, 2002.

* cited by examiner

*Primary Examiner*—Karl Tamai
(74) *Attorney, Agent, or Firm*—John F. Hohimer (57) ABSTRACT

A microelectromechanical (MEM) tiltable-platform apparatus is disclosed which utilizes a light-reflective platform (i.e. a micromirror) which is supported above a substrate by flexures which can be bent upwards to tilt the platform in any direction over an angle of generally ±10 degrees using a gear-driven rack attached to each flexure. Each rack is driven by a rotary microengine (i.e. a micromotor); and an optional thermal actuator can be used in combination with each microengine for initially an initial uplifting of the platform away from the substrate. The MEM apparatus has applications for optical switching (e.g. between a pair of optical fibers) or for optical beam scanning.

24 Claims, 6 Drawing Sheets

Section 2 - 2

FIG. 5A

Section 3 - 3

FIG. 5B

Section 3 - 3

FIG. 5C

THREE-DIMENSIONAL MICROELECTROMECHANICAL TILTING PLATFORM OPERATED BY GEAR-DRIVEN RACKS

GOVERNMENT RIGHTS

This invention was made with Government support under Contract No. DE-AC 04-94AL85000 awarded by the U.S. Department of Energy. The Government has certain rights in the invention.

FIELD OF THE INVENTION

The present invention relates in general to microelectromechanical (MEM) devices and in particular to a three-dimensional microelectromechanical tiltable-platform apparatus which can be used, for example, to redirect (i.e. to switch or scan) an incident light beam.

BACKGROUND OF THE INVENTION

The use of fiber optics greatly increases the bandwidth for data communications and telecommunications. However, a current limitation in information transmission with fiber optics is in routing optical signals between different fibers. What is needed is a viable all-optical switching technology that can be used with fiber optics. Many different approaches to such a technology based on microelectromechanical systems (MEMS) have been proposed (see e.g. U.S. Pat. Nos. 5,959,375; 6,220,561; 6,283,601; 6,300,665; 6,366,414 and U.S. Patent Application Publication No. U.S. 2001/0048265). A primary deficiency of the majority of the MEMS approaches heretofore is that once a micromirror has been positioned at a predetermined angle, that position cannot be maintained without the continued application of electrical power. Furthermore, that position will be lost in the event of an electrical power interruption.

The present invention addresses this deficiency and provides an improvement in the art by providing a microelectromechanical (MEM) tiltable-platform apparatus that is actuated by a plurality of gear-driven racks which can maintain the platform in a tilted position indefinitely in the absence of any applied electrical power, and which can be programmed to provide a tilt angle of generally ±10 degrees in any direction with respect to the plane of a substrate whereon the apparatus is formed.

These and other advantages of the present invention will become evident to those skilled in the art.

SUMMARY OF THE INVENTION

The present invention relates to a microelectromechanical tiltable-platform apparatus comprising a substrate having a platform tiltably supported thereabove by a plurality of flexures each of which is connected to the platform proximate to an outer edge thereof through a compliant member and a plurality of gear-driven racks located on the substrate and moveable in the plane of the substrate, with each rack being connected to an end of one of the flexures to tilt the platform in response to movement of the rack by a rotary microengine located on the substrate. The platform can be used as a tiltable micromirror and can include an optional mirror coating to provide an enhanced reflectivity. The platform in the apparatus can be tilted over an angle that is generally about ±10 degrees in any direction with respect to the plane of the substrate.

Tilting of the platform is effected by providing an actuation voltage to at least one of the rotary microengines, with the platform remaining in a fixed position upon removal of the actuation voltage. Embodiments of the present invention can be provided with three racks or four racks depending upon a particular application and depending upon a particular addressing scheme to be utilized for programming tilting of the platform in the apparatus.

In the apparatus, the substrate can comprise silicon; and the platform preferably comprises a plurality of stacked and interconnected layers of polycrystalline silicon. At least one of the layers of polycrystalline silicon forming the platform can be patterned to form a lattice structure (e.g. a honeycomb structure or a rectangular grid structure). The lattice structure, which can be used to stiffen the remaining layers in the platform, can further include an annulus (i.e. a rim) located beneath the outer edge of the platform for reinforcement of the edge.

Each rotary microengine can comprise a pair of electrostatic comb actuators operatively connected to drive an output gear, with the operative connection between the rotary microengine and the rack generally being made through a reduction gear train (i.e. a transmission). An idler gear can also be located on a side of each rack opposite the reduction gear train.

An optional thermal actuator can be provided in the apparatus to assist each rack in initially uplifting the platform above the substrate. The thermal actuator, which slidingly engages one end of the rack, can comprise an elongate bent beam having each end thereof anchored to the substrate so that the beam will further bow in response to heating by an applied electrical current.

To prevent the platform from contacting the substrate after it has been uplifted, one or more pawls can be provided in the apparatus to engage each rack and limit a backward motion thereof. A plurality of fuses can be provided to anchor the platform to the substrate during fabrication, with the fuses being electrically severed prior to uplifting the platform for movement and tilting thereof.

The present invention further relates to a microelectromechanical tiltable-platform apparatus for redirecting an incident light beam which comprises a tiltable mirror (i.e. a micromirror) supported above a substrate for reflecting the incident light beam, and a plurality of gear-driven racks located on the substrate and spaced about an outer edge of the mirror. Each gear-driven rack is operatively connected to the outer edge of the mirror through a flexure, and is moveable in the plane of the substrate towards the mirror to raise the outer edge and thereby tilt the mirror. Each rack further comprises a rotary microengine operatively connected to move the rack, with the operative connection preferably being through a reduction gear train.

The substrate can comprise silicon, and the tiltable mirror generally comprises a plurality of stacked and interconnected layers of polycrystalline silicon. One or more of the polycrystalline silicon layers can be patterned to form a lattice structure. The lattice structure can be in the form of a honeycomb structure or a rectangular grid structure, and can also include an annulus for reinforcing the edge of the mirror.

A thermal actuator can be optionally provided for each rack, with the thermal actuator being operatively connected to one end of the rack to act in combination with the rotary microengine for initially uplifting the mirror away from the substrate (e.g. when the rotary microengine by itself cannot provide sufficient force for uplifting the mirror). The thermal actuator can comprises an elongate bent beam pinned at each end to the substrate, with the beam further bowing in response to an applied electrical current to urge the rack towards the mirror. One or more pawls can be provided in the apparatus to limit a backwards movement of the rack to prevent the mirror from contacting the substrate, which might otherwise result in stiction (i.e. adhesion of the mirror to the substrate).

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
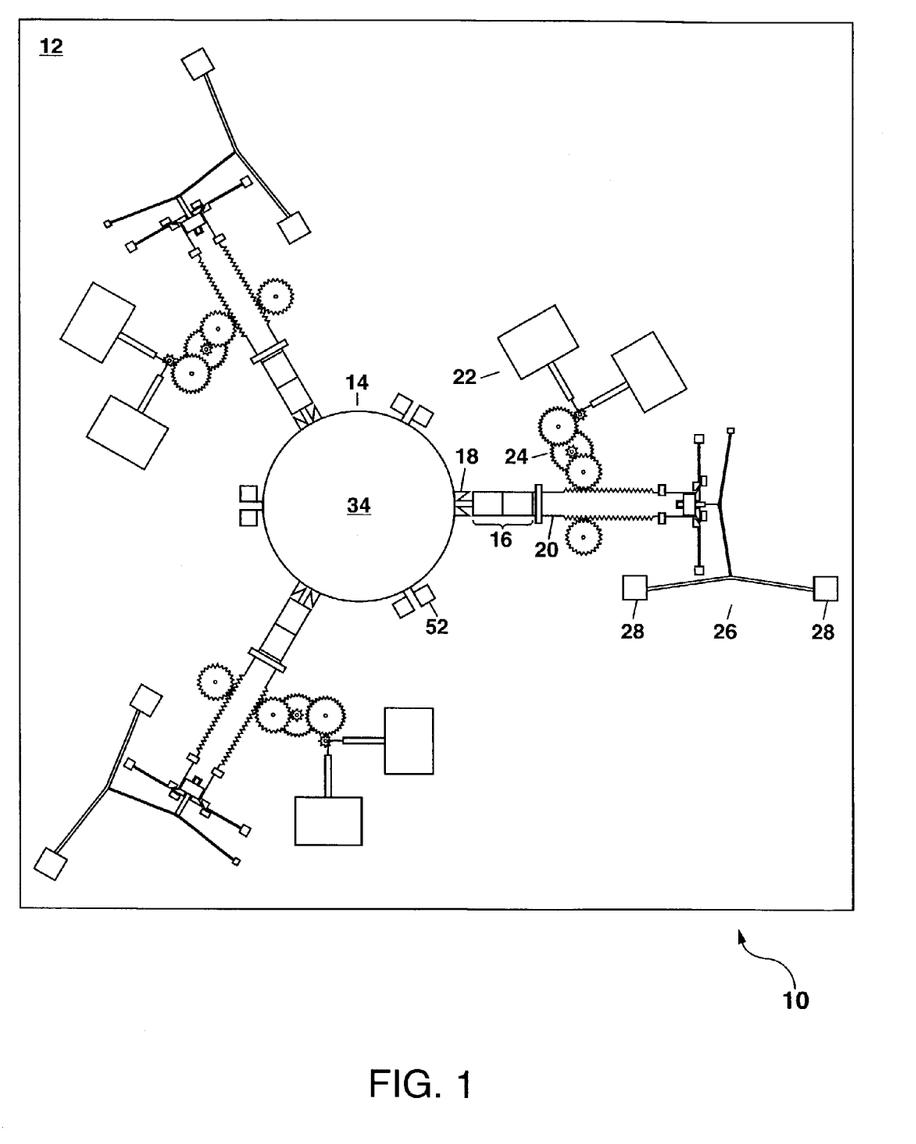
FIG. 1 shows a schematic plan view of an example of the apparatus of the present invention with three gear-driven racks for actuation thereof.

Referring to FIG. 1, there is shown a schematic plan view of an example of the microelectromechanical (MEM) tiltable-platform apparatus 10 (also referred to herein as a tiltable mirror or a tiltable micromirror). The apparatus 10 comprises a substrate 12 whereon a platform 14 is supported suspended above the substrate 12 by a plurality of flexures 16 which are connected to the platform 14 proximate to an outer edge thereof by a compliant member 18. The apparatus 10 further comprises a plurality of gear-driven racks 20 which are located on the substrate 12 and which move in the plane of the substrate 12 toward the platform 14 or away from it, as needed, to adjust and control a tilt angle of the platform 14. Each rack 20 is actuated by a rotary microengine 22 which is coupled to the rack 20 through a reduction gear train 24 (i.e. a transmission).

A thermal actuator 26 can be optionally provided on the substrate 12 as shown in FIG. 1 with electrical contact pads 28 for providing an electrical current to the thermal actuator 26 for operation thereof. The thermal actuator 26 can be used in combination with the rotary microengine 22 as will be described in detail hereinafter to initially uplift the platform above the substrate 12 prior to any tilting thereof. Provision of the thermal actuator 26 in the apparatus 10, in general, will depend on whether or not the rotary microengine 22 acting alone can provide sufficient force through the reduction gear train 24 to urge the rack 20 towards the platform 14 and bend the flexure 16 out of the plane of the substrate 12 to initially uplift the platform 14.

The entire device 10 of FIG. 1 can be fabricated using conventional surface micromachining as known to the art. Surface micromachining involves a series of well-known semiconductor processing steps originally developed primarily for integrated circuits (IC), but which have been adapted to build up MEM structures layer by layer. Using surface micromachining, the various structural elements of the apparatus 10 of FIG. 1 and any associated electrical wiring can be formed from a series of deposition and patterning steps, to build up the structure of the apparatus 10 layer by layer. Polycrystalline silicon and silicon nitride can be used to form the structural elements of the apparatus 10 in FIG. 1, with a sacrificial material such as silicon dioxide or a silicate glass (e.g. TEOS which is used to refer to a silicate glass deposited from the decomposition of tetraethylortho silicate by low-pressure chemical vapor deposition at about 750° C. and densified by a high temperature processing). The silicon nitride can used to provide electrical insulation as needed (e.g. for portions of each thermal actuator and rotary microengine). Altogether, a non-structural layer of polycrystalline silicon (also termed polysilicon) and four structural layers of polysilicon are used to form the device 10 of FIG. 1.

The term "patterning" as used herein refers to a sequence of well-known processing steps including applying a photoresist to the substrate 12, prebaking the photoresist, aligning the substrate 12 with a photomask, exposing the photoresist through the photomask, developing the photoresist, baking the wafer, etching away the surfaces not protected by the photoresist, and stripping the protected areas of the photoresist so that further processing can take place. The term "patterning" can further include the formation of a hard mask (e.g. comprising about 500 nanometers of TEOS) overlying a polysilicon or sacrificial material layer in preparation for defining features into the layer by etching.

To briefly summarize the surface micromachining fabrication process used to construct the MEM apparatus 10, a silicon substrate 12 can be initially coated with dielectric isolation films of low-pressure chemical vapor deposition (LPCVD) silicon nitride (about 8000 Å thick) over a thermal oxide (about 6300 Å thick). Each subsequently deposited and patterned layer of polysilicon or sacrificial oxide can be, for example, in the range of 0.3–2 $\mu$m thick, with the exact layer thickness depending upon the particular elements of the apparatus 10 to be fabricated from each layer of polysilicon or separated by each layer of the sacrificial oxide. The first patterned layer of polysilicon (termed Poly-0) is generally used to form electrical interconnections (e.g. wiring between a plurality of bond pads 28 and the thermal actuators 26 and between additional bond pads, which are not shown in FIG. 1, and each rotary microengine 22). The Poly-0 layer can also be used to form ground planes, as needed, under various elements of the MEM apparatus 10. The Poly-0 layer is generally not structural except when it is used to anchor additional structural polysilicon layers to the substrate 12. the Poly-0 layer can be relatively thin (about 3000 Å) and can be doped with phosphorous or boron for electrical conductivity. All polysilicon depositions used to fabricate the MEM apparatus 10 are LPCVD fine-grained polysilicon deposited at 580° C.

Four additional polysilicon layers (termed Poly-1, Poly-2, Poly-3 and Poly-4) can be used as mechanical (i.e. structural) layers to build up the structure of the MEM apparatus 10 in the example of FIG. 1. The various structural polysilicon layers can be laminated together or connected together at various points to build up the structure of the MEM apparatus 10. The Poly-1 layer can be 1.0 µm thick; the Poly-2 layer can be 1.5 µm thick; and the Poly-3 and Poly-4 layers can be 2.25 µm thick. A thermal annealing step at an elevated temperature (e.g. 1100° C.) can be performed after deposition and patterning of each structural polysilicon layer to alleviate any residual stress therein, with each annealing step preferably being performed after first encapsulating that structural polysilicon layer within a blanket-deposited layer of the sacrificial material. Patterning of each structural polysilicon layer can involve masking and etching (e.g. reactive ion etching) to directly pattern that layer, or blanket depositing the polysilicon into a mold formed by patterning a layer of the sacrificial material on the substrate 12, or both.

Chemical-mechanical polishing (CMP) as known to the art (see U.S. Pat. No. 5,804,084 to Nasby, which is incorporated herein by reference) can be used to planarize each layer of deposited sacrificial material or polysilicon, as needed, to maintain a planar topography of the structure of the MEM apparatus 10 as it is being built up layer by layer. The use of CMP can also be important to provide a smooth surface for the platform 14 for reflecting an incident light beam 100.

After the structure of the MEM apparatus 10 has been built up, the device 10 must be released for operation. This release etch step involves removing the sacrificial material which encapsulates the structure of the apparatus 10. Exposed portions of the sacrificial material can be removed with a selective wet etchant comprising hydrofluoric acid (HF) which dissolves away the exposed portions of the sacrificial material without chemically attacking the polysilicon, silicon nitride or the substrate 12. A plurality of micron-sized access openings (not shown) can be formed through the various polysilicon and silicon nitride layers, as needed, to provide access to any underlying sacrificial material that needs to be removed for release of the MEM apparatus 10. Other portions of the sacrificial material which are left completely encapsulated within the polysilicon or silicon nitride can be retained to form parts of the structure of the MEM apparatus 10. The release etch step can be performed by immersion over a period of several hours, or overnight.

Figure 2:
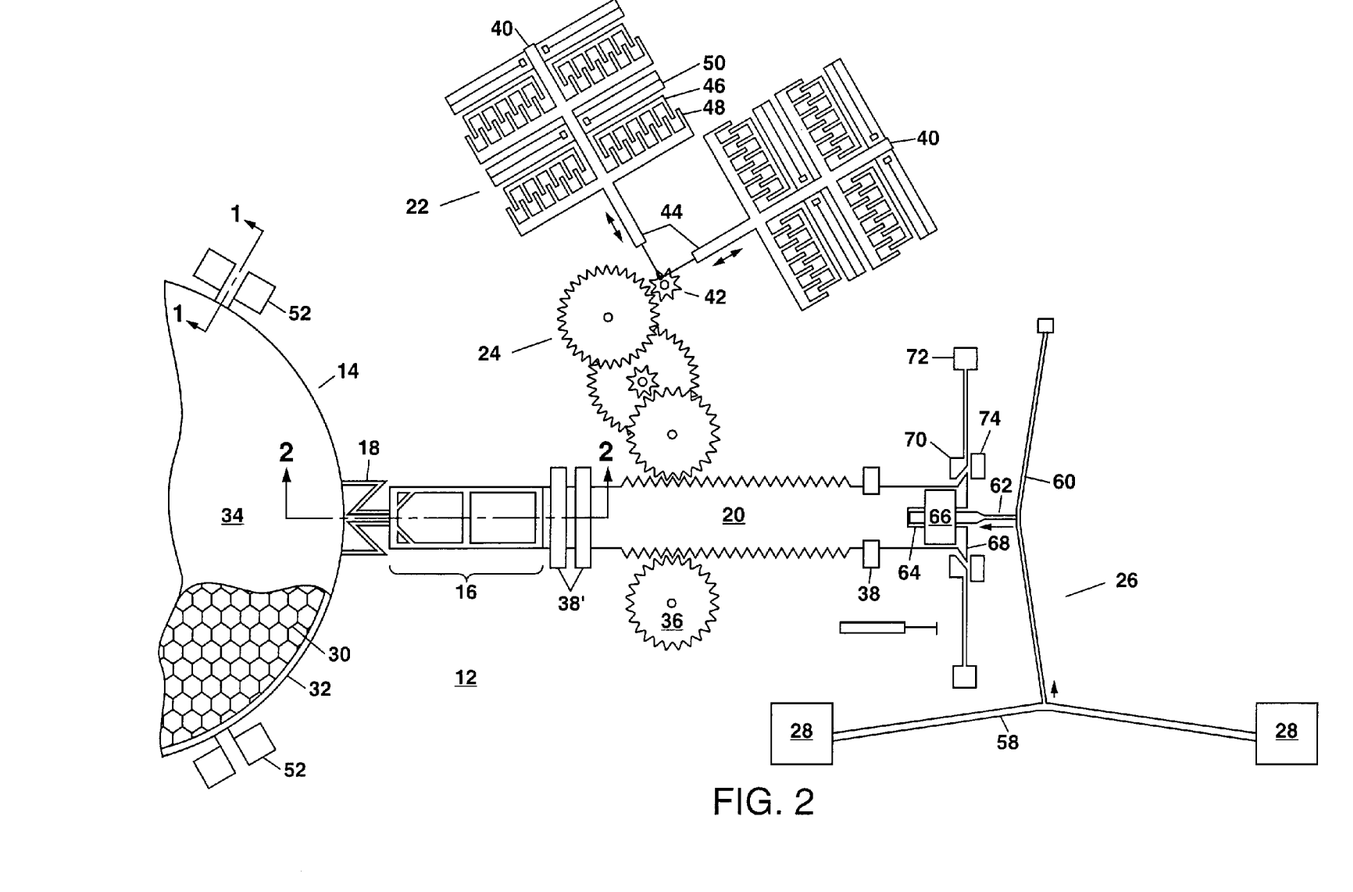
FIG. 2 shows an enlarged schematic plan view of a portion of the apparatus of FIG. 1 to illustrate operation of each gear-driven rack for actuation and tilting of the platform.

FIG. 2 shows an enlarged schematic plan view of a portion of the MEM apparatus 10 of FIG. 1 to illustrate operation of the gear-driven rack for actuation and tilting of the platform. A cutaway view of the platform 14 is also shown in FIG. 2 to illustrate its construction from a plurality of layers of polysilicon (generally Poly-2, Poly-3 and Poly-4) that are laminated together during built-up of the MEM apparatus 10 by surface micromachining. One or more of the polysilicon layers (e.g. Poly-2 or Poly-3 or both) can be optionally patterned to form a lattice structure 30 which can be used to stiffen the platform 14 to prevent any unwanted bowing of the platform 14 due to residual stress. Although the lattice structure 30 is shown as a honeycomb structure in FIG. 2, the lattice structure 30 can be have an arbitrary shape (e.g. a rectangular or polygonal grid). Also shown in the cutaway view of the platform 14 in FIG. 2 is an annulus 32 (i.e. a rim) that can be formed beneath an outer edge of the platform 14 to stiffen the outer edge and to provide a connecting point for the compliant members 18 and for fuses 52 which can be used to hold the platform 14 to the substrate 12 as will be described in detail hereinafter. The annulus 32 can be formed from the same polysilicon layers used to form the lattice structure 30.

The platform 14 can be circular as shown in FIG. 1 or can have an arbitrary shape. The size of the platform 14 can be from about 100 µm to up to a few millimeters depending upon a particular application and a predetermined angle of tilt to be provided by the MEM apparatus 10. The platform 14 has a smooth upper surface which is reflective to light (i.e. an incident light beam 100) so that the platform 14 forms a tiltable mirror. For applications requiring a higher reflectivity than is provided by the polysilicon material forming the platform 14, an optional single-layer or multi-layer mirror coating 34 can be deposited over the surface of the platform 14 to provide a reflectivity of up to 90% or more. The mirror coating 34 can comprise a metal (e.g. gold, aluminum, silver, etc.) or can comprise a dielectric coating (e.g. a plurality of alternating one-quarter-wavelength thick layers of $SiO_2$ and $TiO_2$). The mirror coating 34 can be deposited over the platform 14 using a shadow mask once the MEM apparatus 10 has been formed and the layers sacrificial material removed by selective etching using HF.

In FIG. 2, the gear-driven rack 20 is constrained to move in a linear direction towards the platform 14 to initially uplift the platform 14 off the substrate 12, and then to move either towards the platform 14 or away from it to tilt the platform 14 over an angle which is generally ±10 degrees with respect to the plane of the substrate 12. The range of motion for each rack 20 can be, for example, in the range of 100–500 µm. Motion of the rack 20 for tilting the platform 14 is controlled by the rotary microengine 22 (also termed a micromotor) which is coupled to the rack 20 through the reduction gear train 24. An idler gear 36 can be provided on the substrate 12 opposite the reduction gear train 24 as shown in FIG. 2 and used in combination with with the reduction gear train 24 and a plurality of guides 38 and 38' to constrain the rack to move along a straight line. In FIG. 2, the guides 38' are formed to overlie the rack 20 to prevent the rack from uplifting when force is applied to the flexure 16 to bend it out of the plane of the substrate 12.

The rack 20 can be formed, for example, from the Poly-2 and Poly-3 layers laminated together with the guides 38 and 38' being formed from the Poly-1 through Poly-4 layers. Dimples can be formed underneath the rack 20 and other moveable elements of the MEM apparatus 10 to minimize contact with the substrate 12 and thereby prevent stiction. These dimples can be formed by patterning an underlying layer of the sacrificial material to form a mold in the shape of the dimples and then filling the mold with a deposited layer of polysilicon (e.g. Poly-1).

Figure 5A:
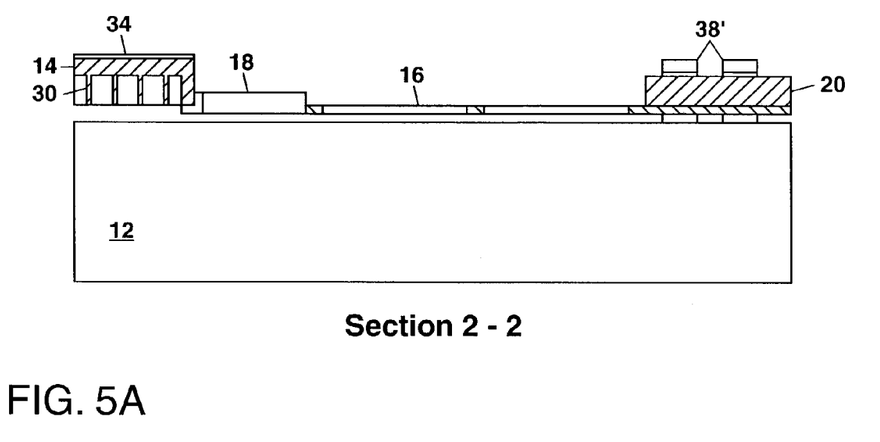
FIG. 5A shows a schematic cross-section view along the section line 2—2 in FIG. 2 to show elements of the apparatus of FIG. 1 prior to an initial uplifting of the platform.
Figure 5B:
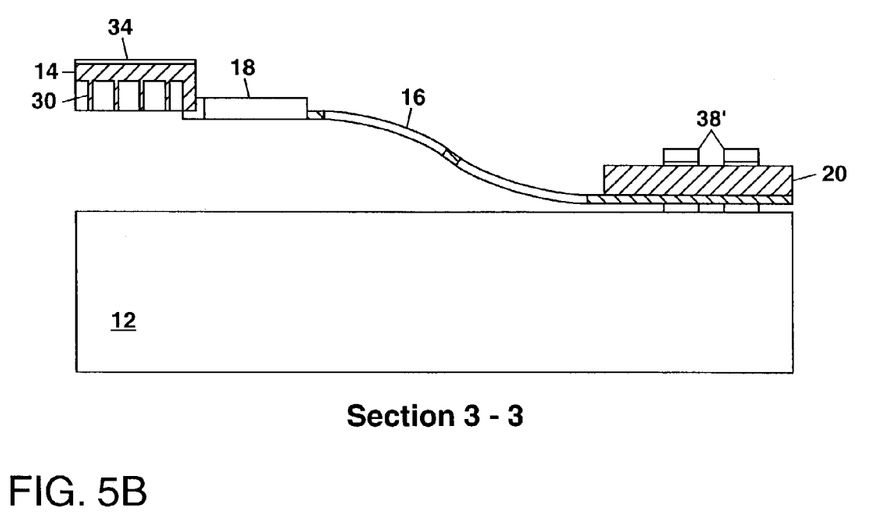
FIG. 5B shows a schematic cross-section view along the section line 3—3 in FIG. 3 to show elements of the apparatus of FIG. 1 after the initial uplifting of the platform.
Figure 5C:
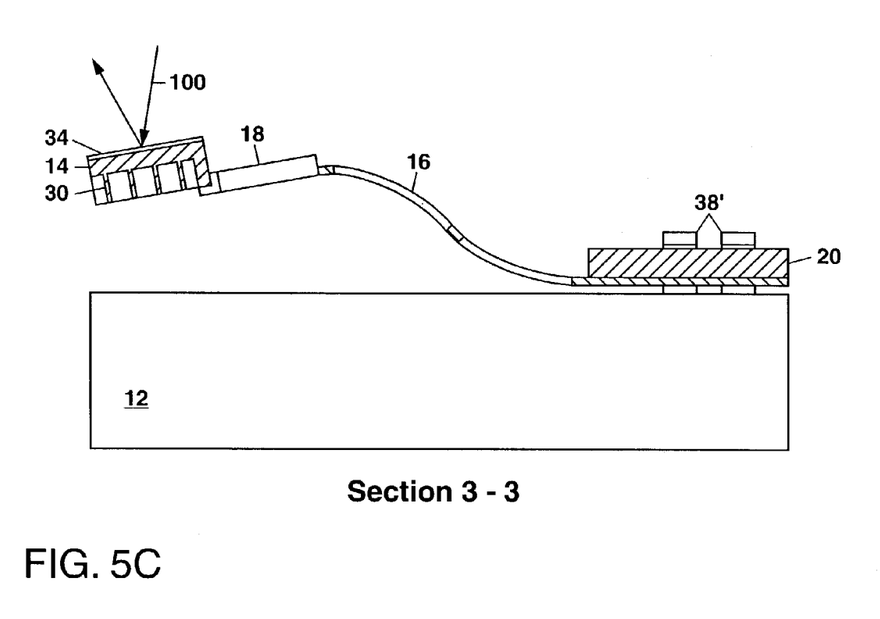
FIG. 5C shows a schematic cross-section view along the section line 3—3 in FIG. 3 to illustrate tilting of the platform in response to further movement of one or more of the racks after the initial uplifting of the platform.

The flexure 16 can be formed from the Poly 1 layer and can extend underneath the rack 20 and be attached thereto as shown in FIGS. 5A–5C, or can alternately be formed from the Poly-4 layer and can partially or entirely overlie the rack 20 and be attached thereto. The compliant member 18 can be formed from the Poly-1 and Poly-2 layers laminated together, or alternately from the Poly-3 and Poly-4 layers depending upon whether the flexure is formed from the Poly-1 or Poly-4 layers. The reduction gear train 24 and the idler gear 36 can be formed from the Poly-2 through Poly-4 layers, with the idler gear 36 and each other gear in FIG. 2 comprising a hub anchored to the substrate about which that gear can rotate.

In FIG. 2, the rotary microengine comprises a pair of electrostatic comb actuators 40 which act in combination to rotate an output gear 42 (i.e. a pinion) using linkages 44. Each electrostatic comb actuator 40 comprises a plurality of stationary electrostatic combs 46 anchored to the substrate 12 (but generally electrically insulated therefrom by a layer of silicon nitride underlying the Poly-0 layer) and a plurality of moveable electrostatic combs 48 suspended above the substrate 12 on folded springs 50. The stationary and moveable electrostatic combs 46 and 48 are arranged in pairs and oriented at right angles as shown in FIG. 2, with a plurality of fingers of one comb of each pair being enmeshed with the fingers of the other comb of that pair. The application of a periodic actuation voltage (e.g. 20–100 volts) between the stationary and moveable electrostatic combs 46 and 48 through electrical contact pads (not shown) connected to each electrostatic comb 46 and 48 generates a periodic electrostatic force of attraction that urges the combs 46 and 48 towards each other to produce a reciprocating motion (e.g. over a distance of 5–30 μm) as indicated by the double-headed arrows in FIG. 2. Operation of the two electrostatic comb actuators 40 out of phase with each other and coupling of the linkages 44 to an off-axis pin joint on the output gear 42 produces a rotation of the output gear 42 for driving the rack 20 through the reduction gear train 24.

The electrostatic comb actuators 40 can be formed from the Poly-1 through Poly-4 layers, with electrical wiring to the stationary and moveable electrostatic combs 46 and 48 being formed from the Poly-0 layer. By forming the stationary and moveable electrostatic combs 46 and 48 from a plurality of stacked layers of polysilicon, the electrostatic force produced by the electrostatic comb actuators 40 is increased since the electrostatic force scales directly with area (i.e. the area on the fingers across which an electric field is produced by the applied actuation voltage). In FIGS. 1 and 2, the moveable electrostatic combs 48 are generally operated at ground electrical potential, and are connected to the electrical wiring or to the substrate 12 through the springs 50. Further details of the rotary mircroengine 22 in FIGS. 1 and 2 can be found in U.S. Pat. Nos. 5,631,514 and 5,955, 801, which are incorporated herein by reference.

Those skilled in the art will understand that other types of electrostatic actuators can be used to form the rotary microengine 22 in other embodiments of the present invention. For example, a short-stroke electrostatic comb or capacitive plate actuator as disclosed in U.S. Pat. Nos. 6,133,670 and 6,507,138 can be used in combination with a compliant displacement multiplier as disclosed in U.S. Pat. No. 6,175,170 as a substitute for each electrostatic comb actuator 40 in the rotary microengine 22 in forming the MEM apparatus 10 of FIGS. 1 and 2. As another example, a torsional ratcheting micromotor as disclosed in U.S. Pat. Nos. 6,211,599 and 6,313,562 can be substituted for the rotary microengine 22 and reduction gear train 24 in the apparatus 10 of FIGS. 1 and 2 and used directly to drive the rack 20. Each of the above patents are incorporated herein by reference.

To initially uplift the platform 14 above the substrate 12 in preparation for tilting of the platform 14, a plurality of electrically-severable polysilicon fuses 52 (see FIGS. 1 and 2), which can be provided to anchor the platform 14 to the substrate 12 during fabrication of the MEM apparatus 10, can be blown (i.e. electrically severed). This is schematically illustrated in FIGS. 4A and 4B which are schematic cross-section views along the section line 1—1 in FIG. 2.

Figure 4A:
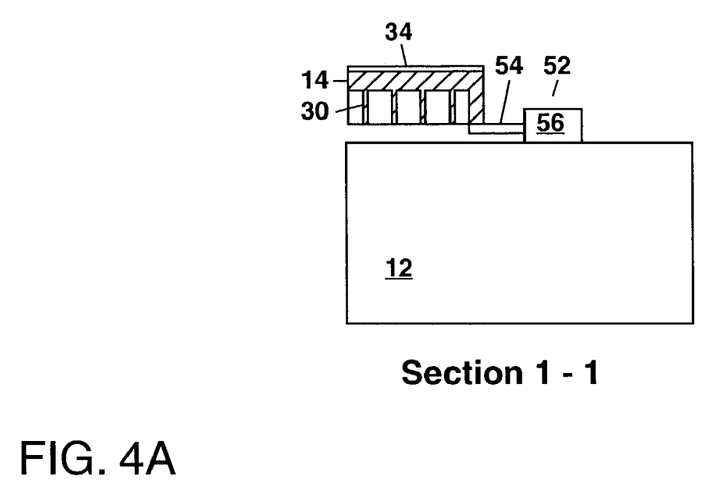
FIG. 4A shows a schematic cross-section view along the section line 1—1 in FIG. 2 to show a plurality of electrically-severable fuses which can be provided in the apparatus to secure the platform during fabrication of the apparatus.

In FIG. 4A, each fuse 52 comprises an elongate fusible link 54 with lateral dimensions of a few microns. Each fusible link 54, which can comprise a doped layer of polysilicon (e.g. Poly-1), can be attached between the platform 14 and a probe pad 56 which is electrically insulated from the substrate 12 (e.g. through an underlying layer of silicon nitride), or alternately between a polysilicon pad (not shown) attached to the platform 14 and the probe pad 56. The fuses 52 hold the platform 14 in place and thereby prevent possible damage to the platform 14 or adhesion of the platform 14 to the substrate 12 during the release etch step.

The process of electrically severing the fuses 52 (i.e. blowing the fusible links 54) can be performed by applying a sufficiently large voltage or voltage pulse (e.g. up to 300 V) from a source or power supply (not shown) across each pair of probe pads 56, or alternately between each probe pad 56 and the platform 14 which is maintained at ground electrical potential. The applied voltage or voltage pulse produces an electrical current sufficiently large to sever (i.e. melt or vaporize) each fusible link 54 as shown in FIG. 4B. The fusible links 54 can also be mechanically severed (e.g. using a probe tip).

Figure 4B:
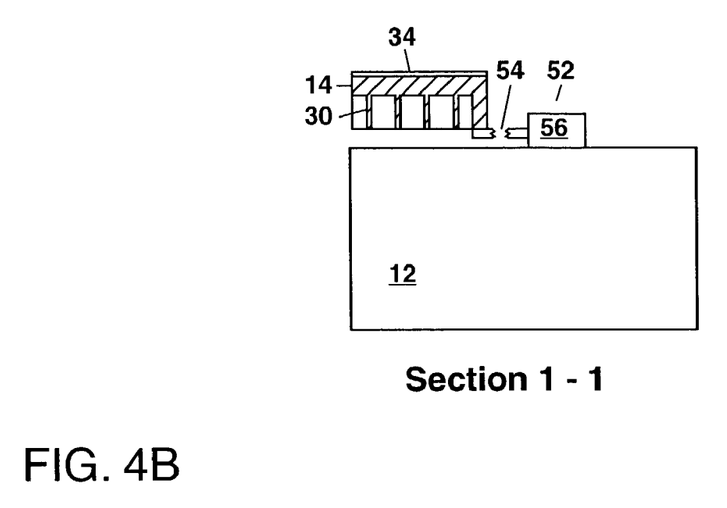
FIG. 4B shows a schematic cross-section view along the section line 1—1 in FIG. 2 after electrical severing of the fuses to prepare for uplifting of the platform in the apparatus.

Locating the fusible links 54 at a level lower than the platform 14 as shown in FIGS. 4A and 4B can be advantageous to prevent the vaporized or melted polysilicon from the severed links 54 from being deposited on an upper surface of the platform 14, especially when a mirror coating 34 has been provided on the platform 14 to enhance the reflectivity for light.

Additionally, it can be advantageous to sever the fusible links 54 using voltages of different polarity applied to each probe pad 56 (e.g. using a positive voltage or voltage pulse applied to one probe pad 56 and a negative voltage or voltage pulse applied to the other probe pad 56 of each pair of fuses 54). This can be done, for example, using an alternating-current (ac) power supply or pulse generator coupled to a primary coil of a transformer having a secondary coil with a center-tap connection to provide two opposite-polarity output voltage waveforms or pulses when the center-tap connection is electrically grounded. The provision of the opposite-polarity voltages or voltage pulses to each probe pad 56 can mitigate effects due to parasitic capacitance or parasitic current paths in the MEM apparatus 10 and ensure that substantially the same electrical current is experienced at the same time in each fuse 52 of a particular pair. The exact magnitude of the voltages or voltage pulses will depend upon the dimensions of the fusible links 54 and can be learned from practice of the present invention.

Once the platform 14 has been released for movement by severing the fuses 52, the rack 20 can be moved towards the platform 14 using the rotary microengine 22 to uplift the platform 14. When the rotary microengine 22 provides insufficient force for the initial uplifting of the platform 14, a thermal actuator 26 can be provided on the substrate 12 as shown in FIGS. 1 and 2 to act in combination with each rotary microengine 22.

Figure 3:
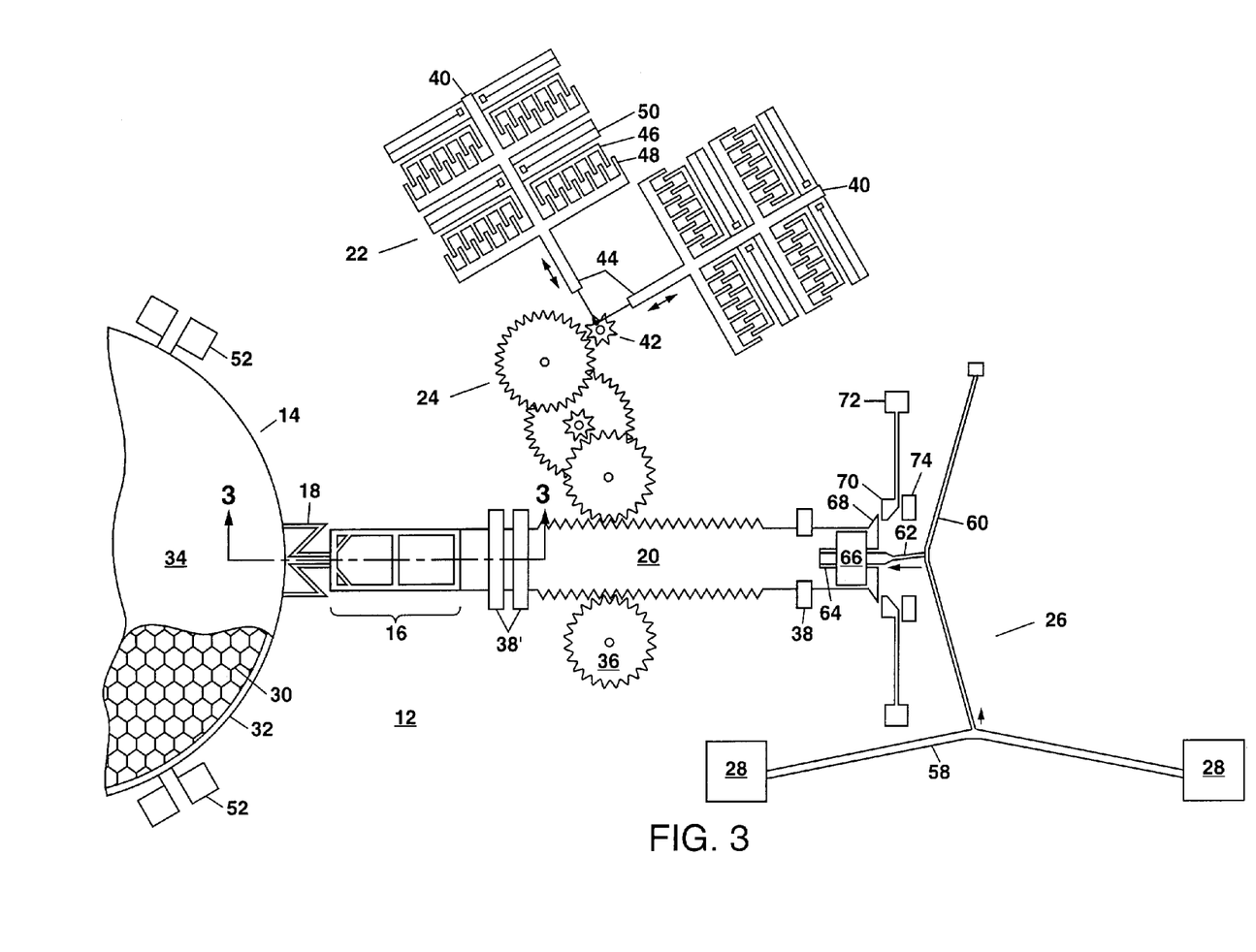
FIG. 3 shows an enlarged schematic plan view of the same portion of the apparatus as in FIG. 2 after an initial uplifting of the platform.

The thermal actuator 26 can comprise a pair of elongate slender flexible bent beams 58 and 60 arranged to form a displacement amplifying structure as shown in FIGS. 1–3. Each beam 58 and 60 can comprise one or more stacked and interconnected polysilicon layers (e.g. Poly-3+Poly-4), with the beam 58 being doped for electrical conductivity (e.g. with boron or phosphorous) and with the beam 60 generally being undoped. The beam 58 is suspended above the substrate 12 between electrical contact pads 28; and the beam 60 is anchored to the substrate 12 at one end thereof, and is connected to a midpoint of the beam 60 at the other end thereof. Each beam 58 and 60 can be up to a few microns wide, with the width of each beam 58 and 60 generally being smaller than its height so that any further bending of the beams 58 and 60 upon activation of the thermal actuator 26 will occur in the plane of the substrate 12 and in the direction that each beam 58 and 60 is already bent.

When an electrical current is provided between contact pads 28, the current flows through beam 58 thereby resistively heating the beam 58 which expands the length of the beam 58. This expansion of the beam 58 buckles the beam 58 in the vertical direction by an extent (indicated by the small vertical arrow in FIGS. 2 and 3) which can be much larger than the expansion of the beam 58. Additionally, buckling of the beam 58 in the vertical direction acts to further bend (i.e. buckle) the beam 60 which produces a movement at a midpoint of the beam 60 which again greatly exceeds the buckling of the beam 58 in the vertical direction. As an example, the provision of a 20 mA electrical current through the beam 58 (e.g. by providing an actuation voltage of +13 volts at one contact pad 28 and −13 volts at to the other contact pad 28) can produce a stroke of about 30 $\mu$m at the midpoint of beam 60 and can provide an initial force of about 500 micro-Newtons ($\mu$N) to a push rod 62 attached to the midpoint of beam 60 as shown in FIG. 2.

The push rod 62 slidingly engages a slot 64 in the end of the rack 20 as shown in FIG. 2. Upon actuation of the thermal actuator 26 and the rotary microengine 22, the rack 20 is urged towards the platform 14 thereby buckling (i.e. bending) the flexure 16 upwards away from the substrate 12 and thereby uplifting the platform 14. This is schematically illustrated in plan view in FIG. 3 and in cross-section view in FIG. 5B. The push rod 62 can be formed, for example, in the Poly-2+Poly-3 layers laminated together and can be constrained to move in the plane of the substrate 12 by a bridge 66 (e.g. formed in the Poly-4 layer) overlying the rack 20 and attached thereto, with the bridge 66 also slidingly engaging the push rod 62. The push rod 62 can be necked down to a width of a few microns as shown in FIGS. 2 and 3 to accomodate movement of the beam 60 in a direction normal to the direction of movement of the push rod 62.

In FIGS. 1–3, each flexure 16 can be made with a box-frame construction to resist lateral movement or buckling in a horizontal direction parallel to the plane of the substrate 12, while being compliant in a vertical direction normal to the plane of the substrate 12 to allow each flexure 16 to buckle in the vertical direction, as needed, to tilt the platform 14. Each flexure 16 can be, for example, 20–50 $\mu$m wide and 100–500 $\mu$m long.

Each flexure 16 can be connected to the platform 14 proximate to an outer edge thereof through a compliant member 18 which can be formed to be more compliant than the flexures 16 in the horizontal direction while generally being less compliant than the flexures 16 in the vertical direction. The compliant member 18 can have a folded beam construction as shown in FIGS. 1–3 which allows for some movement and twisting of the compliant member 18, as needed, to tilt the platform 14 in different directions. The width of the folded beam forming the compliant member 18 can be, for example, 4 $\mu$m; its thickness can be 3–6 $\mu$m; and its overall length can be 50–100 $\mu$m.

As shown in FIG. 3, to prepare the platform 14 for tilting after the platform 14 has been released by severing the fuses 52, each rack 20 is initially moved by a distance (e.g. 15 $\mu$m) sufficient for outward extending wings 68 on each side of the rack 20 to bend one or more spring-loaded pawls 70 cantilevered above the substrate 12 from anchors 72 and to bypass the pawls 70. The pawls 70 can be formed in the Poly-1 through Poly-3 layers and can include one or more dimples formed underneath to allow the pawls 70 to glide over the substrate 12. A stop 74 can be formed from the Poly-0 through Poly-2 layers proximate to each pawl 70 to act in combination with the pawl 70 to limit a backwards motion of each rack 20. This is advantageous since it prevents the possibility of the platform 14 contacting the substrate 12 during operation of the MEM apparatus 10 with such contact possibly resulting in adhesion (i.e. stiction) of the platform 14 and/or other elements (e.g. the flexures 16 and compliant members 18) to the substrate 12.

FIG. 5B shows a schematic cross-section view along the section line 3—3 in FIG. 3 to illustrate the initial uplifting of the platform 14 which is produced by motion of each rack 20 and bending of the flexure 16 attached to each rack 20. To initially uplift the platform 14, the individual racks 20 can be actuated separately in turn, or in unison.

Once the platform 14 has been uplifted above the substrate 12 as shown in FIG. 5B, the platform 14 can be tilted to reflect an incident light beam 100 as shown in FIG. 5C. This can be done by further movement of one or more of the racks 20 towards the platform 14 or away from it. The exact tilt angle of the platform 14 and the direction of a reflected portion of the incident light beam 100 will depend upon the position of each rack 20 which can be determined by indexing each rack 20 to the stops 74 and by knowing the exact actuation voltage signal (i.e. number of voltage pulses) applied to each rotary microengine 22. Movement of each rack 20 forward or backward can be effected by controlling a relative phase of the periodic actuation voltage provided to each electrostatic comb actuator 40 to rotate the output gear 42 in the clockwise or counterclockwise direction.

Once a particular tilt angle and direction have been programmed into the MEM apparatus 10 using the actuation voltage signal, which can be generated using electronic signal-generation circuitry or a computer, the tilt angle and direction will remain fixed until one or more of the racks 20 are moved by providing another actuation voltage signal. This can be advantageous, for example, to establish an optical connection in free space or between a pair of optical fibers. When an optical connection is made between a pair of optical fibers, the incident light beam 100 can come from one of the optical fibers, and the reflected portion of the light beam 100 can be redirected into the other optical fiber. Once an optical connection is established using the MEM apparatus 10 of the present invention, the connection will continue indefinitely without the application of any electrical power to the device 10. This also makes the MEM apparatus 10 of the present invention impervious to a power interruption which is generally deleterious to conventional tiltable micromirror devices.

Other applications and variations of the present invention will become evident to those skilled in the art. For example, other embodiments of the present invention can be formed with four racks 20 which can simplify tilting of the platform 14 to a particular angle and direction using since opposing pairs of the racks 20 can be oriented along Cartesian coordinate axes (i.e. an x-axis and a y-axis) to provide an addressing scheme that can be simpler that required for the apparatus of FIG. 1. As another example, a one-dimensional or two-dimensional array of MEM devices 10 can be formed on a common substrate 12 for redirecting (i.e. switching) a plurality of light beams 100. As yet another example, the rotary microengine can be actuated using one or more thermal actuators (see e.g. U.S. Pat. No. 6,313,562, which is incorporated herein by reference). The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A microelectromechanical tiltable-platform apparatus, comprising:
(a) a substrate;
(b) a platform tiltably supported above the substrate by a plurality of flexures, with each flexure being connected to the platform proximate to an outer edge thereof through a compliant member;
(c) at least three gear-driven racks located on the substrate and moveable in the plane of the substrate, with one of the racks being connected to an end of each flexure to tilt the platform in response to movement of at least one of the racks by a rotary microengine located on the substrate; and
(d) a thermal actuator operatively connected to an end of each rack opposite the flexure to act in combination with the rack to initially uplift the platform above the substrate.

2. The apparatus of claim 1 wherein the substrate comprises silicon.

3. The apparatus of claim 1 wherein the platform comprises a plurality of stacked and interconnected layers of polycrystalline silicon.

4. The apparatus of claim 3 wherein at least one of the layers of polycrystalline silicon is patterned to form a lattice structure.

5. The apparatus of claim 4 wherein the lattice structure comprises a honeycomb structure or a rectangular grid structure.

6. The apparatus of claim 5 wherein the lattice structure further includes an annulus located beneath the outer edge of the platform.

7. The apparatus of claim 1 wherein each rotary microengine comprises a pair of electrostatic comb actuators operatively connected to drive an output gear.

8. The apparatus of claim 7 wherein the output gear is operably connected to move the rack through a reduction gear train.

9. The apparatus of claim 8 further including an idler gear located on a side of each rack opposite the reduction gear train.

10. The apparatus of claim 1 wherein the platform is tiltable over an angle of ±10 degrees in any direction with respect to the plane of the substrate.

11. The apparatus of claim 1 wherein the platform is tiltable in response to an actuation voltage applied to at least one of the rotary microengines, with the platform remaining in a fixed position upon removal of the actuation voltage.

12. The apparatus of claim 1 wherein a surface of the platform includes a mirror coating.

13. The apparatus of claim 1 wherein the plurality of gear-driven racks comprises three or four racks.

14. The apparatus of claim 1 further comprising a plurality of fuses anchoring the platform to the substrate during fabrication thereof, with each fuse being electrically or mechanically severable to release the platform for movement.

15. A microelectromechanical tiltable-platform apparatus, comprising:
(a) a substrate;
(b) a platform tiltably supported above the substrate by a plurality of flexures, with each flexure being connected to the platform proximate to an outer edge thereof through a compliant member;
(c) a plurality of gear-driven racks located on the substrate and moveable in the plane of the substrate, with one end of each rack being connected to one of the flexures to tilt the platform in response to movement of the rack by a rotary microengine located on the substrate; and
(d) a thermal actuator operatively connected to another end of each rack to act in combination with the rack to initially bend each flexure upward thereby uplifting the platform above the substrate.

16. A microelectromechanical tiltable-platform apparatus, comprising:
(a) a substrate;
(b) a platform tiltably supported above the substrate by a plurality of flexures, with each flexure being connected to the platform proximate to an outer edge thereof through a compliant member;
(c) a plurality of gear-driven racks located on the substrate and moveable in the plane of the substrate, with one of the racks being connected to an end of each flexure to tilt the platform in response to movement of at least one of the racks by a rotary microengine located on the substrate; and
(d) at least one pawl to engage each rack to prevent the platform from contacting the substrate.

17. A microelectromechanical tiltable-platform apparatus for redirecting an incident light beam, comprising:
(a) a tiltable mirror supported above a substrate for reflecting the incident light beam;
(b) three or four gear-driven racks located on the substrate and spaced about an outer edge of the mirror, with each gear-driven rack being operatively connected to the outer edge of the mirror through a flexure, and with each gear-driven rack further comprising a rotary microengine operatively connected to move the rack in the plane of the substrate towards the mirror to raise the outer edge thereby tilting the mirror; and
(c) a thermal actuator operatively connected to an end of each rack to act in combination with the rotary microengine for initially uplifting the mirror away from the substrate.

18. The apparatus of claim 17 wherein the substrate comprises silicon.

19. The apparatus of claim 17 wherein the tiltable mirror comprises a plurality of stacked and interconnected layers of polycrystalline silicon.

20. The apparatus of claim 19 wherein at least one of the layers of polycrystalline silicon is patterned to form a lattice structure.

21. The apparatus of claim 20 wherein the lattice structure comprises a honeycomb structure or a rectangular grid structure.

22. The apparatus of claim 17 wherein the rotary microengine is operatively connected to move the rack through a reduction gear train.

23. The apparatus of claim 17 wherein each thermal actuator comprises an elongate bent beam anchored to the substrate at each end thereof, with the beam being further bowed in response to heating by an applied electrical current.

24. The apparatus of claim 17 further including a pawl for engaging an end of each rack to prevent the mirror from contacting the substrate.

* * * * *